United States Patent [19]

Payne

[11] Patent Number: 5,596,872

[45] Date of Patent: Jan. 28, 1997

[54] HYDRO-MECHANICAL POWER TRANSMISSION

[76] Inventor: William H. Payne, 111 Pratt St., Madison, N.C. 27025

[21] Appl. No.: 323,629

[22] Filed: Oct. 17, 1994

[51] Int. Cl.[6] .......................... F16D 31/02; F16D 39/00
[52] U.S. Cl. ................. 60/468; 60/487; 60/494
[58] Field of Search .................... 60/468, 487, 489, 60/494; 91/491; 92/12.1, 58, 72

[56] References Cited

U.S. PATENT DOCUMENTS

| | | |
|---|---|---|
| 2,645,085 | 7/1953 | Gerhold . |
| 2,837,193 | 6/1958 | Wilder, Jr. . |
| 3,190,074 | 6/1965 | Johns ........................ 60/487 |
| 3,241,642 | 3/1966 | King . |
| 3,292,755 | 12/1966 | Rogers . |
| 3,667,227 | 6/1972 | Bentkowsky et al. ........... 60/489 X |
| 4,132,072 | 1/1979 | Schlinke ..................... 60/487 X |
| 4,133,417 | 1/1979 | Glasson et al. . |
| 4,142,617 | 3/1979 | Collier . |
| 4,481,770 | 11/1984 | Lohbauer et al. ............. 60/489 X |
| 4,627,237 | 12/1986 | Hutson ........................... 60/487 |
| 4,938,330 | 7/1990 | Wallentowitz et al. . |
| 4,981,201 | 1/1991 | Hawkins . |
| 5,074,825 | 12/1991 | Hamasaki et al. . |

FOREIGN PATENT DOCUMENTS

0141948  11/1979  Japan .......................... 60/487

*Primary Examiner*—Hoang Nguyen
*Attorney, Agent, or Firm*—Shefte, Pinckney & Sawyer

[57] ABSTRACT

A fluid power transmission for driving automotive accessories at a constant speed with a variable speed input includes a pump driven by a motor vehicle engine in communication with a hydraulic motor which drives the motor vehicle accessories. A working fluid is disposed within a conduit system which communicates the pump driving force with the hydraulic motor. A flow control valve in the return line from the hydraulic motor to the pump provides a constant input flow rate to the pump independent on motor vehicle engine speed and the accessory load on the hydraulic motor to provide a constant output speed at a necessary pressure for the pump to maintain the accessories at a predetermined optimal rotational speed.

20 Claims, 5 Drawing Sheets

HYDRO-MECHANICAL POWER TRANSMISSION

BACKGROUND OF THE INVENTION

The present invention relates broadly to devices for transmitting mechanical energy and, more particularly, to an apparatus which produces a constant rotary output speed from a variable speed rotary input force and is particularly useful in motor vehicle applications.

In conventional automobiles, trucks and similar motor vehicles, a wide variety of accessory equipment is typically provided, including, for example, power-assisted steering and braking units, air conditioner compressors, engine cooling fans, and electrical generators or alternators for providing electrical power for battery charging. The driving members for the various accessories are conventionally rotatably driven directly from the crank shaft of the vehicle engine, with the power being transmitted generally by a belt. Accordingly, the driving members are subject to a widely varying rotational input driving speed during the course of the ordinary operation of the vehicle, the rotary input speed from the crank shaft typically varying several thousand revolutions per minute.

Because ordinary vehicle driving conditions require frequent periods of engine operation at low, idling speeds thereof, most of these accessory units are necessarily designed for operation at full capacity and/or optimum efficiency at low or idling engine speeds. Therefore, at all greater engine speeds in excess of idling speed, a progressively greater than necessary rotational input speed is transmitted from the engine crank shaft to these accessory units, whereby these units are caused to be operated at high level of RPM and thereof inefficiently, with attendant decreases in available motive engine horsepower and fuel economy, throughout the periods of operation of the vehicle at speeds other than idling speed. In addition to the aforementioned disadvantages of inefficiency, the varying rotational input speeds to these accessories create correspondingly varying physical strains, electrical strains or both, thereon which initially requires particular engineering of the accessories to withstand such strains and ultimately may contribute to or cause the premature failure of the accessories.

These problems were addressed in Payne U.S. Pat. No. 4,541,513, defining an invention of the present applicant. There, a fluid power transmission was provided to receive a variable speed rotary input and to provide a constant speed rotary output. In that device, the housing was rotatable and used a centrifugally actuated valve disposed in the housing which remained closed at rotational speeds of the housing assembly at less than a predetermined optimum speed and provided graduated fluid flow in a fluid circuit to create slippage of the housing assembly about a rotor arrangement to limit increases in the rotational speed of the housing assembly over the optimum speed.

Other attempts to provide constant rotary output from a variable speed rotary input include the approach of Wilder, Jr., in U.S. Pat. No. 2,837,193 which is also based on centrifugal force. There, the vanes of a hydraulic motor were made movable to vary the surface area presented to moving hydraulic fluid and therefore the speed of the motor could be controlled. Proper speed control is difficult with the centrifugal devices due to the mechanically displaceable parts which offer a degree of unreliability under the vibrations experienced in motor vehicle operation.

SUMMARY OF THE INVENTION

It is accordingly an object of the present invention to provide a hydro-mechanical power transmission which does not rotate or rely on centrifugal force and is easily mountable in a motor vehicle application. Further, the present invention is highly efficient and provides commensurate fuel savings and lower exhaust emissions.

More specifically, a hydro-mechanical power transmission for receiving a variable rotary speed and input force and transmitting a relatively substantially constant rotary output speed is provided which includes a housing; a first rotor arrangement rotatably mounted to the housing for being rotatably driven by the input force and in direct variable speed relation therewith; a pump arrangement mounted to the housing and driven by the first rotor arrangement; a hydraulic motor assembly mounted within the housing; and a second rotor arrangement rotatably mounted to the housing and being rotatably driven by the hydraulic motor assembly for presenting the rotary output force for power takeoff thereof. A conduit arrangement is formed in the housing and extends between the pump arrangement and the hydraulic motor assembly for fluid communication therebetween. A working fluid is disposed in the conduit arrangement for driving the hydraulic motor assembly responsive to operation of the pump arrangement. An arrangement is provided for controlling the flow of the working fluid to maintain the hydraulic motor assembly at a substantially constant rotary speed as the rotary speed of the pump arrangement is varied by the variable input speed with the substantially constant speed of the hydraulic motor assembly maintaining a substantially constant rotary output speed at the second rotor arrangement. The flow control arrangement preferably includes a valve, while the working fluid is preferably a non-compressible hydraulic fluid. The flow rate is preferably controlled by the flow control valve.

The present invention is adapted for use with either a synthetic working fluid which does not expand substantially when heated or a natural fluid which may undergo thermal expansion and contraction, such as automatic transmission fluid. To that end, the transmission may further include a reservoir arrangement for being partially filled with the working fluid thereby providing space for the working fluid to expand responsive to temperature increases. The reservoir arrangement is communicated with the conduit arrangement.

Since the present invention is preferably adaptable to automotive and other vehicular engines, an apparatus is provided for communicating the rotary engine force to the present invention. In that regard, the first rotor arrangement includes a rotor and an assembly for communicating the input force from an engine to the rotor including a belt for driving the rotor responsive to input from the engine. Similarly, the second rotor arrangement includes an assembly for communicating the output force to the power-driven automotive accessories. Since these accessories are commonly belt-driven, the second rotor arrangement includes a belt driven rotor and a belt extending between the rotor and the accessories for driving the accessories by the second rotor at a substantially constant speed.

To further extend the life of engine and accessory components, the accessories are not powered during engine starting operations. This removes a substantial load from the battery and the starter motor. To that end, a threshold valve is provided for preventing the working fluid from driving the hydraulic motor assembly when the input speed is less than a predetermined value. As will be seen, below, e.g., 200 rpm the present invention has no driving effect on the accessories. However, above, e.g., 200 rpm the threshold valve is actuated by the increased flow rate and the hydro-mechanical power transmission of the present invention is activated to maintain a constant power output rotational speed to the accessories.

A problem with previous power transmissions of this type has been that the housing was rotatable which made mounting difficult. Further, an unacceptable amount of heat was generated in the working fluid at high engine speeds. The present invention, however, includes the pump arrangement, the hydraulic motor assembly, the conduit arrangement, the working fluid and the flow control arrangement within the housing which is stationarily mountable to a support.

Preferably, the pump arrangement includes at least one positive displacement pump, having a variable displacement with a substantially constant flow rate output and being driven by a camming surface which is in turn driven by the first rotor arrangement. It is preferred that the first rotor arrangement include a rotor and a shaft driven by the rotor with the shaft having the camming surface formed thereon for mechanical communication with the at least one positive displacement pump.

It is further preferred that the hydraulic motor assembly include a plurality of vanes, or other like members, disposed circumferentially about a shaft with the shaft being mechanically communicated with the second rotor arrangement. The hydraulic motor shaft is preferably hollow and the pump shaft extends coaxially therethrough. Preferably, the hydraulic motor arrangement shaft has the second rotor arrangement attached thereto and the pump arrangement shaft has the first rotor arrangement attached thereto for power input to the pump arrangement and power output from the hydraulic motor assembly.

By the above, the present invention provides a compact easily mountable fluid power transmission which is primarily adapted for automotive and other motor vehicle use. The present invention extends the life of both engine and accessories by more effectively matching power input to the needs of the accessories and by removing the accessory load from the engine starting assembly during starting operation.

DETAILED DESCRIPTION OF THE PREFERRED EMBODIMENT

Figure 1:
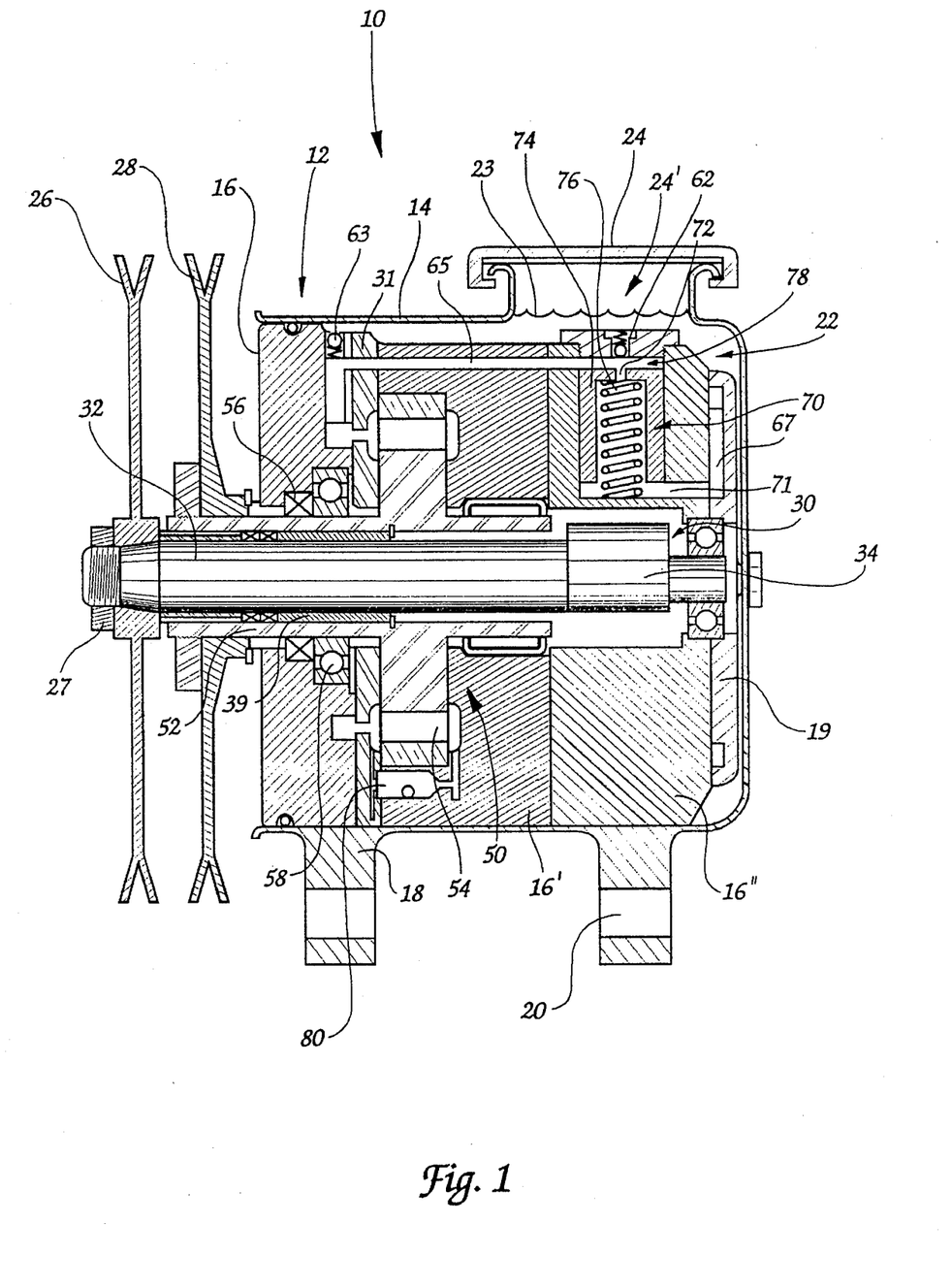
FIG. 1 is a vertical section view of a fluid power transmission according to a first preferred embodiment of the present invention.

Turning now to the drawings and, more particularly, to FIG. 1, a hydro-mechanical power transmission according to a first preferred embodiment of the present invention is illustrated generally at 10 and includes a housing 12 having an outer skin 14 mounted to an end mounting block 16, all of which is generally cylindrical in overall configuration. Two mounting lugs 18 project outwardly from the housing 12 for mounting to a support. To that end, bolt openings 20 are formed in the mounting lugs 18 in a generally linearly aligned manner for bolting the apparatus to a support within the engine compartment of a motor vehicle. The housing 12 is solidly mountable to a support and includes the majority of primary components within the outer skin 14 of the housing 12. Within the housing 12, in generally linear alignment, a hydraulic motor mounting block 16' is mounted to the end block 16 with a motor side plate 31 disposed therebetween and a pump block 16" is mounted to the hydraulic motor block 16'. An end cap 19 is mounted to the pump block 16". The blocks 16,16',16", the end cap 19, and the side plate 31 are all machined or cast metal pieces having the necessary openings formed therein, as will be seen in greater detail hereinafter.

The present invention requires a working fluid to operate and, according to a first preferred embodiment of the present invention, the working fluid 23 is contained within a reservoir 22 which is formed intermediate the outer skin 14 and the mounting blocks 16,16',16". A filler cap 24 is mounted on the top of the housing 12 and covers an input opening 24' which allows access to the working fluid 23. According to the first preferred embodiment of the present invention, the working fluid may be automatic transmission fluid, or another like fluid, and the reservoir 22 includes sufficient space for the fluid 23 to expand.

In order to transmit power to and from the fluid power transmission 10 of the present invention, and in order to accommodate conventional automotive accessory power takeoff systems, two rotors 26,28 are provided for input and output of power to the fluid power transmission 10. The rotors 26,28 are circular wheel-like members having a circumferential V-shaped groove formed in the outer end surface thereof to accommodate a conventional automotive V-belt. An input rotor 26 is mounted forwardly of an output rotor 28 in generally linear alignment to provide easy power input and power takeoff to and from the hydromechanical power transmission 10. The details of rotor mounting will be discussed in greater detail hereinafter.

All of the primary operating components of the present invention, except the rotors 26,28, are contained within the housing 12 including a pump 30, a hydraulic motor 50, a conduit arrangement 60, a flow control valve 70, a bypass valve 80, and the aforesaid reservoir 22. These components will be discussed individually in detail presently.

Figure 2:
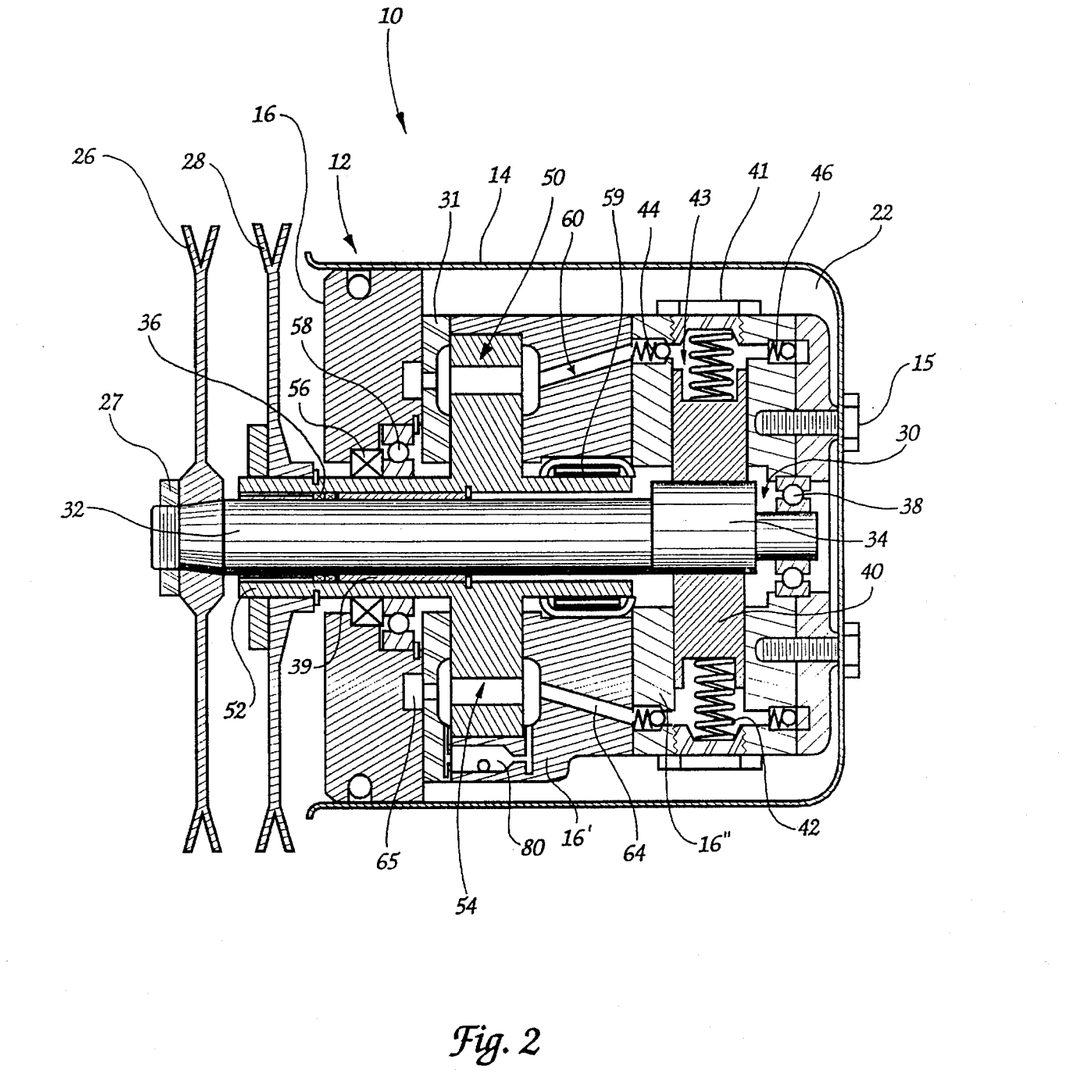
FIG. 2 is a horizontal section view of the fluid power transmission illustrated in FIG. 1.

Turning now to FIG. 2, a positive and variable displacement pump 30 is disposed in the endmost portion of the housing 12 away from the rotors 26,28, within the pump block 16". Preferably, the pump 30 is a two-piston positive displacement pump. The pump 30 is driven by a pump shaft 32 which extends the length of the housing from the most inward end where it is mounted on bearings 38 and a bushing 39, through the housing 12, to an end point on which the input rotor 26 is mounted using a retaining screw 27 on a threaded shaft terminus. The pump shaft 32 is supported internally by packing 36 and the bushing 39. A cam lobe 34 is disposed adjacent the inner bearing 38 within a cavity formed in the pump block 16". Two oppositely disposed pistons 40 are slidingly mounted within piston cavities 43 formed in the pump block 16" for driving movement by the cam lobe 34. The pistons 40 are biased against the cam lobe 34 by springs 42 which are mounted intermediate removable spring and piston plugs 41 and the cam lobe 34. Therefore, and as will be seen in greater detail hereinafter, as the input rotor 26 is rotated, the pump shaft 32 is caused to rotate which results in the rotation of the cam lobe 34 which alternately drives each piston 40 against the piston spring 42 to evacuate the piston cavities 43, causing flow of the working fluid 23.

A hydraulic motor 50 is mounted intermediate the end block 16, side plate 31, and the pump block 16" within the hydraulic motor block 16'. The hydraulic motor 50 consists of a plurality of vanes 54 disposed around a shaft 52. The motor shaft 52 is hollow and the pump shaft 32 is mounted concentrically therewithin. As may be expected, the pump shaft 32 and the hydraulic motor shaft 52 are independently rotatable and operate conjunctively only through the application of working fluid pressure. The hydraulic motor shaft 52 is supported internally within the housing 12 by packing 56 and bearings 58 on one end and roller bearings 59 on the opposite end.

A conduit system 60 is formed within the pump block 16" the hydraulic motor block 16', and the end block 16 to provide fluid communication between the pump 30 and the hydraulic motor 50 using the working fluid 23. With references to FIGS. 1 and 2, first conduits 60,64 extend from the pump 30 to the hydraulic motor 50 as seen in FIG. 2. The first conduits 60,64 extend from outlets of the piston chambers 43 to the hydraulic motor vanes 54. A second conduit system 65 extends from the vanes 54 to the flow control valve 70 as seen in FIG. 1. A third conduit 67 extends from the flow control valve 70 to the piston chambers 43 of the pump 30. As seen in FIG. 2, an input valve 46 is disposed at the inlet to each piston chamber 43 of the pump 30 and an output valve 44 is disposed adjacent the output of each piston chamber 43.

As may be expected, output force is taken from a second rotor 28 which is driven by the hydraulic motor shaft 52. To maintain this output at a constant rotational speed, input to the hydraulic motor 50 must be maintained constant in the form of a constant flow rate of the working fluid. This must be achieved even though the input speed applied to the pump and the load applied to the pump by the motor is variable. This is accomplished by the use of a flow control valve 70 as seen in FIG. 1. The flow control valve 70 is disposed within the pump block 16" and consists of a piston 74 disposed in a chamber with an inlet opening 72 of predetermined size communicated with the second conduit 65. A biasing spring 76 biases the piston 74 against fluid flow. The piston 74 has an upper damming surface 78 which, along with the inlet opening 72, acts in concert with the spring 76 via porting area 71 to impede fluid flow and acts to maintain flow through the inlet 72 at a constant rate. This is due to a fluid pressure differential across the piston, from top to bottom. The pressure difference causes the valve piston 74 to move against the spring 76 to maintain the desired fluid flow rate by varying a valve porting area 71 in the piston cylinder wall as the piston reciprocates. This causes the fluid to be maintained at a predetermined constant flow rate regardless of other influences such as accessory load changes, temperature changes and the like. Therefore, output of the flow control valve 70 which is routed through the third conduit 67 to the pump 30 is maintained at a constant pressure and therefore input of working fluid to the pump is maintained at a relatively constant negative flow rate the negative pressure is created by the limiting nature of the valve in concert with the demanding nature of the pump.

In order to maintain the accessories in a deactivated and therefore non-loading state while the motor vehicle engine is being started, the working fluid is directed around the vanes 54 of the hydraulic motor below a predetermined flow rate level, corresponding to a predetermined engine speed threshold, i.e., 200 rpm. In that regard, a bypass valve 80 is disposed within the hydraulic motor block 16' in a normally open condition to allow the working fluid to bypass the hydraulic motor 50. The bypass valve 80 is normally open being closed by a fluid flow rate greater than a predetermined level corresponding with a predetermined engine output.

Figure 3:
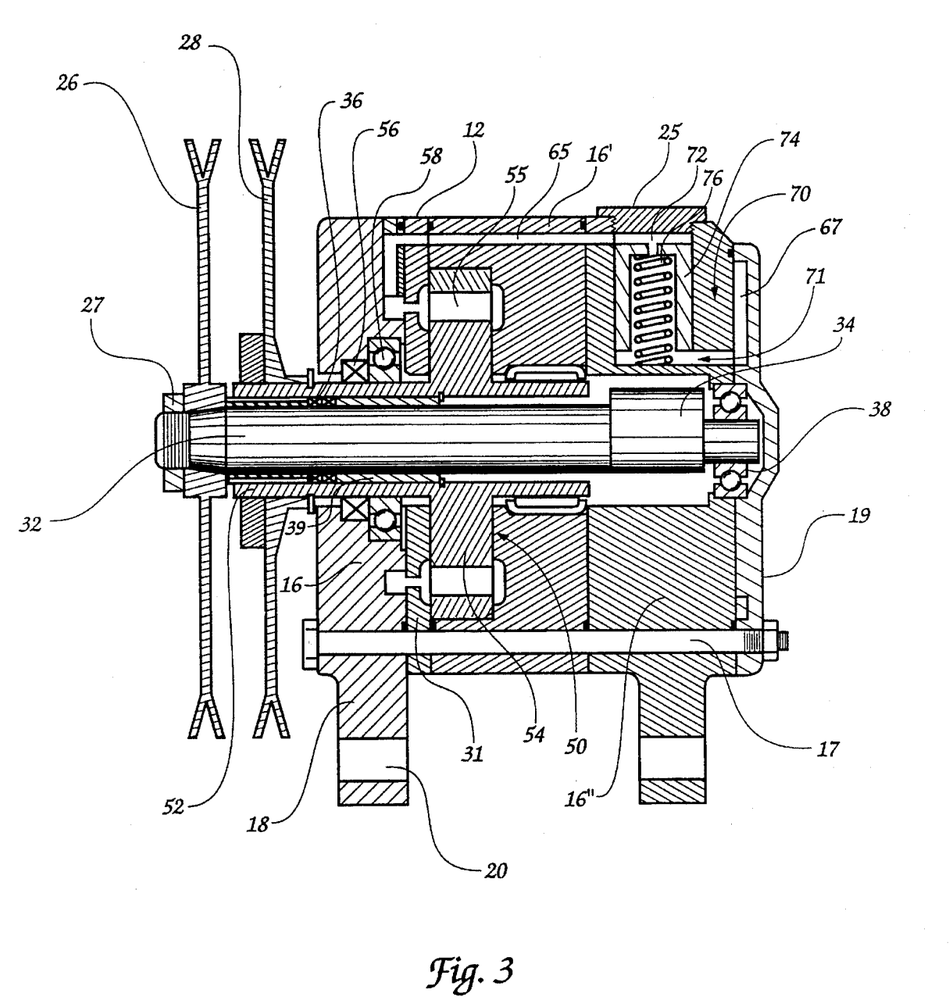
FIG. 3 is a vertical section view of a fluid power transmission according to a second preferred embodiment thereof.

With reference to FIG. 3, a second preferred embodiment of the present invention is disclosed. The primary components of the present invention are unchanged from one preferred embodiment to the other. However, the second preferred embodiment is configured for use with a synthetic fluid or other like fluid which does not require an expansion chamber. In that regard, the second preferred embodiment of the present invention provides a sealed system which is bounded by the first mounting block 16, the side plate 31, the hydraulic motor block 16' and the pump block 16". An end cap 19 is disposed at the end opposite that of the rotors 26,28. The blocks 16,16',16", the side plate 31 and the end cap 19 are all bolted together using elongate connecting bolts 17. The use of a sealed system with a non-expanding working fluid provides for a more compact system and requires fewer parts, i.e., the reservoir inlet and outlet valves 62,63 are not required. Both embodiments remain the same in other respects.

Figure 4:
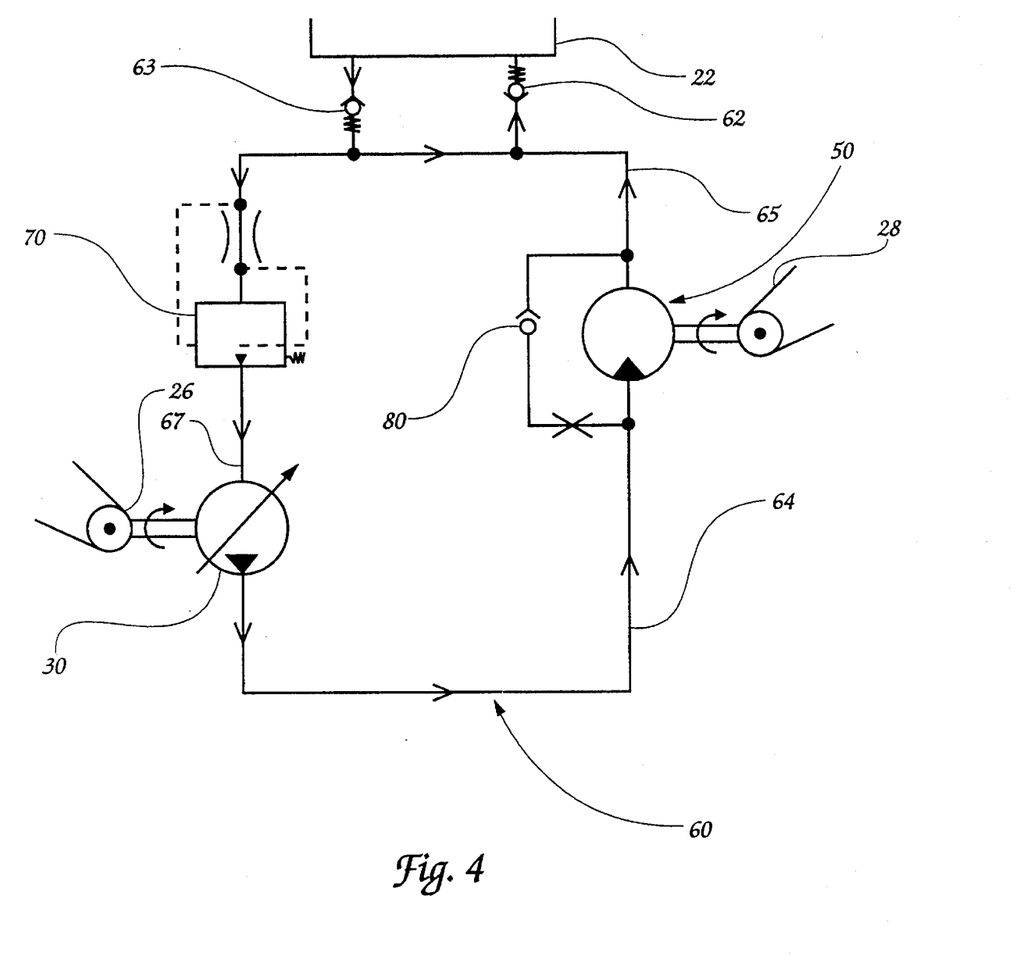
FIG. 4 is a schematic representation of the fluid power transmission illustrated in FIG. 1.
Figure 5:
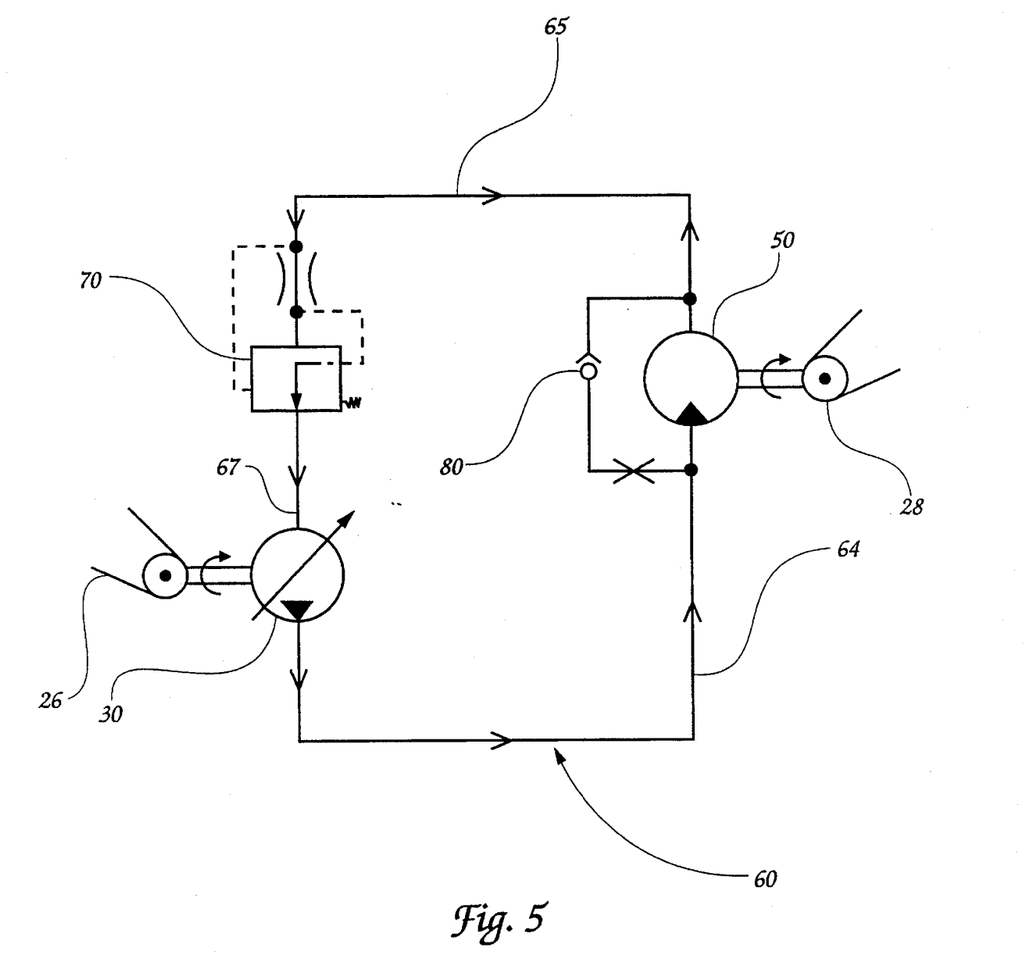
FIG. 5 is a schematic representation of the fluid power transmission illustrated in FIG. 3.

Operation of the present invention is generally as follows. Reference should initially be made to FIGS. 4 and 5 which offer a schematic viewpoint of system operation. Initially, a rotary input force is applied to the first rotor 26, and that force is transmitted to the pump 30. Pump action causes the working fluid to flow through the conduit system 60 and initially from the pump 30 to the motor 50 through the first conduit 64. Once the engine has increased its speed beyond the predetermined starting threshold, the bypass valve 80 closes and the hydraulic motor 50 is activated. The hydraulic motor then turns the second rotor 28 which powers the automotive accessories. The working fluid flows from the hydraulic motor 50 and is directed through the second conduit 65 to the flow control valve 70. The flow control valve 70 proportions the working fluid 67 in conduit which is returned to the pump 30.

Turning now to FIGS. 1 and 2, a more detailed explanation of the operation can be offered. A rotary input force from the automotive engine is applied to the rotor 26 which causes rotation of the pump shaft 32. As best seen in FIG. 2, the camming lobe 34 rotates with the pump shaft 32 and joint action of the cam lobe 34 and the springs 42 causes reciprocal movement of the pump pistons 40, thereby causing evacuation of the piston chambers 43. This pumping action causes the working fluid to move under pressure through the pump output valves 44 through the first conduit 64 where it is directed into contact with the vanes 54 of the hydraulic motor which, once the bypass condition has been alleviated, starts to rotate. Output of the hydraulic motor 50 is transmitted through the hydraulic motor shaft 52 to the second rotor 28 for takeoff and application to automotive accessories.

From the vanes 54, the working fluid is routed through the third conduit 65, as seen in FIG. 1, through the inlet opening 72 of the flow control valve 70, through the third conduit 67, through the pump inlet valve 46, as seen in FIG. 2, and back to the piston chambers 43 of the pump 30.

As the engine rpm increases to idle speed, the pump output increases and the output speed of the hydraulic motor correspondingly increases to a predetermined optimum operational speed, i.e., 1200 rpm at which it is maintained in light of fluctuations at the input rotor 26. If with the increased input rotational speed of the input rotor 26, the pump 30 attempts to increase fluid flow rate within the system. However, due to the biasing force of the control valve piston 74 which is applied through the biasing spring 76 the added flow rate is denied by the flow control valve 70 and the output of the flow control valve 70 is maintained constant. Therefore, in a sense, the pump 30 is denied an increase in additional working fluid flow rate and the stroke length of the pistons 40 is correspondingly maintaining thereby reducing the pump output flow rate and thereby maintaining a constant fluid flow rate within the system so that the vanes 54 of the hydraulic motor 50 are subjected to a substantially constant flow rate above a predetermined, optimal rpm level.

Fluid pressure generated by the pump is therefore a function of the load applied to the hydraulic motor which matches the load on the hydraulic motor with the pump output to maintain the hydraulic motor with a constant output speed at the output rotor 28, compatible with accessory load variations.

By the above, the present invention provides a fluid power transmission which maintains a constant output rotational speed, for driving automotive accessories at a like predetermined optimal rotational speed in the face of a varying input force and speed and is readily mountable in a motor vehicle engine compartment.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A hydro-mechanical power transmission for receiving a variable speed rotary input and transmitting a relatively substantially constant speed rotary output, said transmission comprising:

a fixed housing;

first rotor means rotatably mounted to said housing for being rotatably driven by the input in direct variable speed relation therewith;

pump means mounted within said housing and driven by said first rotor means;

hydraulic motor means mounted within said housing;

second rotor means rotatably mounted to said housing and being rotatably driven by said hydraulic motor means for presenting the constant speed rotary output for power takeoff thereof;

conduit means formed in said housing and extending between said pump means and said hydraulic motor means for fluid communication therebetween;

working fluid means flowably disposed in said conduit means for driving said hydraulic motor means responsive to operation of said pump means; and means for controlling flow of said working fluid means to maintain said hydraulic motor means at a substantially constant rotary speed as the rotary speed of said pump means is varied by the variable speed input, said substantially constant speed of said hydraulic motor means maintaining a substantially constant speed rotary output at said second rotor means.

2. A hydro-mechanical power transmission according to claim 1 wherein said flow control means includes a valve.

3. A hydro-mechanical power transmission according to claim 1 wherein said working fluid means includes a non-compressible hydraulic fluid.

4. A hydro-mechanical power transmission according to claim 1 wherein said working fluid expands when heated and said transmission further comprises reservoir means for being partially filled with said working fluid to provide space for said working fluid to expand and contract responsive to temperature variations with said reservoir means being communicated with said conduit means.

5. A hydro-mechanical power transmission according to claim 4 wherein said working fluid means includes automatic transmission fluid.

6. A hydro-mechanical power transmission according to claim 1 wherein said working fluid means includes a synthetic fluid which does not expand significantly when heated.

7. A hydro-mechanical power transmission according to claim 1 wherein said first rotor means includes a rotor and means for communicating the input force from an engine to said rotor.

8. A hydro-mechanical power transmission according to claim 7 wherein said force communicating means is a belt for driving said rotor responsive to input from said engine.

9. A hydro-mechanical power transmission according to claim 1 wherein said second rotor means includes means for communicating the output force to power-driven automotive accessories.

10. A hydro-mechanical power transmission according to claim 9 wherein said accessories are belt-driven and said second rotor means includes a belt-driving rotor and a belt extending between said rotor and said accessories for driving said accessories by said second rotor at a substantially constant speed.

11. A hydro-mechanical power transmission according to claim 1 wherein said transmission further comprises threshold valve means for preventing said working fluid from driving said hydraulic motor means when the input flow rate is less than a predetermined value.

12. A hydro-mechanical power transmission according to claim 1 wherein said housing contains said pump means, said hydraulic motor means, said conduit means, said working fluid means, and said flow control means therewithin and is stationarily mountable to a support.

13. A hydro-mechanical power transmission according to claim 1 wherein said pump means includes at least one positive and variable displacement pump, having a constant flow rate output and being driven by a camming surface driven by said first rotor means.

14. A hydro-mechanical power transmission according to claim 1 wherein said hydraulic motor means includes a plurality of force transmission elements disposed circumferentially about a shaft, said shaft being mechanically communicated with said second rotor means.

15. A hydro-mechanical power transmission according to claim 13 wherein said first rotor means includes a rotor and a shaft driven by said rotor and having said camming surface formed thereon for mechanical communication with said at least one positive and variable displacement pump.

16. A hydro-mechanical power transmission according to claim 15 wherein said hydraulic motor means includes a plurality of sealing members disposed circumferentially about a shaft, said shaft being mechanically communicated with said second rotor means.

17. A hydro-mechanical power transmission according to claim 16 wherein said hydraulic motor means shaft is hollow and said pump shaft extends coaxially therethrough.

18. A hydro-mechanical power transmission according to claim 17 wherein said hydraulic motor means shaft has said shaft rotor means attached thereto and said pump means shaft has said first rotor means attached thereto for power input to said pump means and power output from said hydraulic motor means.

19. A hydro-mechanical power transmission for receiving a variable speed rotary input force and transmitting a relatively substantially constant speed rotary output, said transmission comprising:

a housing stationarily mounted to a support;

a pump mounted within said housing;

first rotating means mounted to said housing for driving said pump responsive to the variable speed input;

a hydraulic motor mounted within said housing;

a second rotor mounted to said housing for being driven by said hydraulic motor;

conduit means containing a working fluid and extending within said housing between said pump and said hydraulic motor for fluid communication therebetween;

flow control means disposed within said housing along said conduit means intermediate said pump and said hydraulic motor for maintaining a substantially constant fluid flow rate to said pump to provide a substantially constant fluid flow rate to said hydraulic motor to provide the substantially constant speed rotary output at said second rotor, said flow control valve operating responsive to a variable flow from said pump due to the variable input flow rate applied to the first rotor.

20. A hydro-mechanical power transmission according to claim 19 wherein said transmission further comprises a threshold valve operable to divert said working fluid around said hydraulic motor when said input force is less than a predetermined value.

* * * * *

UNITED STATES PATENT AND TRADEMARK OFFICE
CERTIFICATE OF CORRECTION

PATENT NO. : 5,596,872
DATED : Jan. 28, 1997
INVENTOR(S) : William H. Payne

It is certified that error appears in the above-identified patent and that said Letters Patent is hereby corrected as shown below:

Column 5 after line 2 start new sentence "Piston spring 42 should be of such strength as to not allow pistons to "float".
Column 5, Line 57 insert word "negative" before word "pressure".
Column 5, Line 58 delete word "negative" and put a period after word "rate" and capital "t" on word "the".
Column 8, line 67, claim 15, 4th line thereof, delete word "said".
Column 10, claim 19, line 15 delete words "flow rate" and insert word "speed".
Drawing Fig. 4 arrow on line 65 between values 62 and 63 to be reversed.
Drawing Fig. 5 arrow on top part of line 65 to be reversed.

Signed and Sealed this

Fourth Day of August, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,596,872
DATED : January 28, 1997
INVENTOR(S) : William H. Payne

It is certified that error appears in the above-identified patent and that said Letters Patent is hereby corrected as shown below:

Abstract, line 9, delete "on" and insert -- of --

Column 1, line 36, delete "thereof" and insert -- therefore --

Column 2, line 65, delete "speed" and insert -- flow rate --

Column 7, line 8, delete "maintaining" and insert -- reduced --

Column 7, line 9, delete "reducing" and insert -- maintaining --

Signed and Sealed this

First Day of December, 1998

Attest:

BRUCE LEHMAN

*Attesting Officer*  *Commissioner of Patents and Trademarks*